United States Patent [19]

Langstein et al.

[11] Patent Number: 5,668,232

[45] Date of Patent: Sep. 16, 1997

[54] PROCESS FOR THE PRODUCTION OF POLYISOOLEFINS

[75] Inventors: Gerhard Langstein, Kürten; Dieter Freitag, Krefeld; Michael Lanzendörfer, Pegnitz; Karin Weiss, Bindlach, all of Germany

[73] Assignee: Bayer AG, Leverkusen, Germany

[21] Appl. No.: 677,638

[22] Filed: Jul. 8, 1996

[30] Foreign Application Priority Data

Jul. 10, 1995 [DE] Germany .................. 195 25 035.4

[51] Int. Cl.$^6$ .................................. C09F 4/52; C08F 10/10
[52] U.S. Cl. .................. 526/189; 526/185; 526/209; 526/212; 526/216; 526/217; 526/220; 526/336; 526/339; 526/348.7; 502/152; 502/155; 502/156
[58] Field of Search ..................... 526/189, 185, 526/209, 212, 217, 216, 220, 348.7, 165; 502/152, 155, 156; 556/175, 179

[56] References Cited

U.S. PATENT DOCUMENTS

| | | | |
|---|---|---|---|
| 3,645,920 | 2/1972 | Schlatzer, Jr. | 526/189 X |
| 3,850,897 | 11/1974 | Priola et al. | 526/189 X |
| 5,032,653 | 7/1991 | Cheradame et al. | 526/189 X |
| 5,326,838 | 7/1994 | Quiteria et al. | 526/189 X |
| 5,329,032 | 7/1994 | Tran et al. | 526/165 X |

*Primary Examiner*—Fred Teskin
*Attorney, Agent, or Firm*—Connolly and Hutz

[57] ABSTRACT

Polyisoolefins are obtained using the process according to the invention by polymerising isoolefins, optionally with conjugated or unconjugated dienes and/or cationically polymerisable, mono- or polyunsaturated compounds at temperatures of $-100°$ C. to $+100°$ C. and pressures of 0.1 to 100 bar in solution, in suspension or in the gas phase in the presence of initiator systems consisting of certain hydrocarbons and open-chain and/or cyclic aluminoxane compounds.

5 Claims, No Drawings

PROCESS FOR THE PRODUCTION OF POLYISOOLEFINS

The present invention relates to a process for the production of polyisoolefins by the polymerisation of isoolefins in solution, in suspension or in the gas phase, optionally in the presence of conjugated or unconjugated dienes, and/or cationically polymerisable, mono- or polyunsaturated compounds. The present invention furthermore relates to novel initiator systems for the polymerisation of isoolefins.

Cationic polymerisation of isoolefins, most particularly of isobutene, has long been known and is described in numerous prior publications (see, for example, J. P. Kennedy, E. Marechal, *Carbocationic Polymerisation*, 1982, A. Gandini & H. Cheradame in *Advances in Polymer Science*, volume 34/35 (1980)). Lewis acids or protonic acids are used in the prior art as initiators for this polymerisation. Polymerisation is preferably performed in the presence of halogenated hydrocarbons, such as methyl chloride, methylene chloride or carbon tetrachloride.

However, disadvantages of the known processes are that often only low molecular weight polymers are obtained and polymerisation may successfully be performed only at low temperatures in polar, in particular halogenated solvents.

The object of the present invention is to provide a process, in accordance with which isoolefins may be homo- or copolymerized at temperatures that are higher than hitherto conventional to yield high molecular weight products.

It has now been found that high molecular weight polyisoolefins may be produced at elevated temperatures if the isoolefins are polymerised in the presence of novel initiator systems which are based on aluminoxane compounds and mono- or polyfunctionalised hydrocarbons of the general formula $R^3$, $R^4$, $R^5C$—X where X in particular denotes halogen.

The present invention accordingly provides a process for the production of polyisoolefins, which process is characterised in that isoolefins of the formula $CH_2=CR^1,R^2$ where $R^1$ denotes methyl and $R^2$ $C_1$–$C_{10}$ alkyl or $C_3$–$C_{10}$ cycloalkyl, optionally together with conjugated or unconjugated dienes with 4 to 20 carbon atoms and/or cationically polymerisable, mono- or polyunsaturated compounds with 4 to 20 carbon atoms are polymerised at temperatures of $-100°$ C. to $+200°$ C. and pressures of 0.1 to 100 bar in solution, in suspension or in the gas phase in the presence of initiator systems consisting of:

a) hydrocarbons of the formula (I)

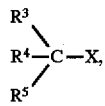

in which

X denotes halogen, SCN, CN, OH, $OR^5$, $OCOR^5$ or $COOR^5$, preferably halogen, where $R^5$ denotes $C_1$–$C_{10}$ alkyl or $C_3$–$C_{10}$ cycloalkyl, and $R^3$, $R^4$, $R^5$ are identical or different and mean hydrogen, $C_1$–$C_{10}$ alkyl, $C_3$–$C_{10}$ cycloalkyl, $C_6$–$C_{18}$ aryl, $C_3$–$C_{10}$ alkenyl or $C_3$–$C_{10}$ alkyne, optionally substituted by X, and b) an open-chain and/or cyclic aluminoxane compound of the formula (II) or (III)

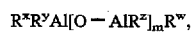

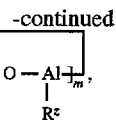

in which $R^x$, $R^y$, $R^z$, $R^w$ are $C_1$–$C_{12}$ alkyl and m represents an integer from 5 to 30.

The isoolefins preferably used are those where $R^1$ denotes Me, $R^2$ denotes $C_1$–$C_6$ alkyl such as methyl, ethyl, propyl. Isobutene and 2-methyl-1-butene are preferred, in particular isobutene. Conjugated and unconjugated dienes with 4 to 20, preferably 4 to 10, particularly preferably 4 to 6 carbon atoms which may be considered for the process according to the invention are: butadiene, isoprene, piperylene, 2,3-dimethylbutadiene,2,4-dimethyl-1,3-pentadiene, cyclopentadiene,methylcyclopentadiene, limonene, myrcene and 1,3-cyclohexadiene, preferably isoprene, piperylene and 2,3-dimethylbutadiene, particularly preferably isoprene. Further copolymerisable mono- or polyunsaturated organic compounds preferably with 4 to 10 carbon atoms which are suitable for the process according to the invention are: styrene, p-methylstyrene and divinylbenzene, particularly preferably divinylbenzene.

In the process according to the invention, the conjugated or unconjugated and/or the mono- or polyunsaturated organic compounds are copolymerized in quantities of 0.01 to 20 mol. %, preferably in quantities of 1 to 10 mol. %, wherein the dienes and polyunsaturated organic compounds may be copolymerized in any mixing ratio with each other.

Polymerisation according to the invention is performed in a known manner in solution, suspension or in the gas phase continuously or discontinuously, in a single or multiple stages at a temperature of $-100°$ C. to $+200°$ C., preferably of $-100°$ C. to $+100°$ C., particularly preferably of $-50°$ C. to $+50°$ C. and at a pressure of 0.1 to 100 bar, preferably of 1 to 50 bar.

In this process, initiator component a) is used at a concentration of $10^{-3}$ to $10^{-7}$, preferably of $10^{-4}$ to $10^{-6}$ mol per liter of reactor volume.

Initiator component b) (aluminoxane) is used in a molar ratio relative to component a) of 1:100 to $10^4$:1, preferably of 1:10 to $10^2$:1, very particularly preferably of 1:1 to 10:1 (component b):component a)).

Hydrocarbons of the formula (I) which are considered as component a) of the initiator system are in particular those in which X denotes Chlorine or bromine, in particular chlorine, and $R^3$, $R^4$, $R^5$ are identical or different and mean hydrogen, $C_1$–$C_{10}$ alkyl, $C_3$–$C_{10}$ cycloalkyl, $C_6$–$C_8$ aryl, $C_3$–$C_{10}$ alkenyl or $C_3$–$C_{10}$ alkyne, in particular $C_1$–$C_{10}$ alkyl. The following are preferably cited: methyl chloride, chloroethane and 2-chloropropane.

Methyl, ethyl or butylaluminoxanes, in particular methylaluminoxane as are, for example, described in *Polyhedron*, volume 7, no. 22/23 (1988), pp. 2375 et seq., are preferably suitable as component b).

The novel initiator system for the polymerisation of isoolefins very particularly preferably consists of the following components a): methyl chloride, ethyl chloride and/or benzyl chloride and the following component b): methylaluminoxane.

Initiator components a) and b) may be added to the monomer mixture simultaneously or consecutively, continuously or discontinuously. The aluminoxanes may also be produced in situ by the hydrolysis of appropriate alkylaluminium compounds. It is moreover possible to use the initiator components in pretreated form. Pretreatment is taken to be the ageing of the components in the absence of the monomers to be used.

Polymerisation according to the invention is preferably performed in solution or suspension. Solvents or suspending agents which may be considered are those organic solvents or suspending agents which are inert under reaction conditions, such as hexane, isopentane and/or toluene, preferably hexane.

The favourable quantity of solvent or suspending agent may readily be determined by appropriate preliminary testing. The quantity is generally 80–95 vol. %, relative to the sum of solvent or suspending agent and monomer.

The process according to the invention may, for example, be performed as follows: The reactor, cooled to the reaction temperature, is, for example, charged with purified solvent and the monomers. Once the reactor has been adjusted to the desired reaction temperature, a small proportion of initiator component b) is apportioned and stirred with the monomer mixture. Initiator component a) and the remainder of initiator component b) are then apportioned and the contents of the reactor vigorously mixed. In a preferred embodiment, initiator component a) and the remainder of initiator component b) are premixed some time before they are added to the reaction mixture. All operations are performed under a protective gas, such as nitrogen or argon. The course of the reaction is monitored by the evolution of heat. On completion of the exothermic reaction, the mixture is shortstopped, for example with 2,5-di-tert.-butyl-4-methylphenol dissolved in ethanol. The reactor is then depressurised, the resultant solution of the polymer is worked up in the conventional manner by stripping or, if desired, passed on to a halogenation stage in a subsequent reaction. The resultant polymer may in this manner directly be functionalised, i.e. halogenated.

The present invention also provides a novel initiator system for the polymerisation of isolefins which system consists of a) hydrocarbons of the formula (I)

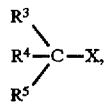

in which

X denotes halogen, SCN, CN, OH, $OR^5$, $OCOR^5$ or $COOR^5$, preferably halogen, where $R^5$ denotes $C_1$–$C_{10}$ alkyl or $C_3$–$C_{10}$ cycloalkyl, and $R^3$, $R^4$, $R^5$ are identical or different and mean hydrogen, $C_1$–$C_{10}$ alkyl, $C_3$–$C_{10}$ cycloalkyl, $C_6$–$C_{18}$ aryl, $C_2$–$C_{10}$ alkynyl or $C_3$–$C_{10}$ alkyne, optionally substituted by X, and b) an open-chain and/or cyclic aluminoxane compound of the formula (II) or (III)

in which $R^x$, $R^y$, $R^z$, $R^w$ are $C_1$–$C_{12}$ alkyl and m represents an integer from 5 to 30.

It is particularly surprising that it is possible according to the invention to use, for example, primary alkyl halides, such as methyl chloride, in combination with aluminoxanes for the polymerisation of isoolefins, as only tert.-alkyl compounds have hitherto been activatable by co-initiators, i.e. were used for the polymerisation of isoolefins. Another surprising finding is that it is possible by means of the novel initiator system according to the invention to produce polyisoolefins having molecular weights distinctly higher than those of the prior art.

The Polyisoolefins produced using the process according to the invention have average molecular weights $M_w$ of 2 to 20000 kg/mol, preferably of 20 to 10000 kg/mol, very particularly preferably of 200 to 800 kg/mol. Yields are generally in excess of 90% of theoretical (determined gravimetrically).

EXAMPLES

General Description of Polymerisation Tests

Purified and desiccated solvent was initially introduced into the reactor under protective gas (argon) and cooled to −78° C. Isobutene was then introduced into the reactor and condensed and the quantity determined by weighing. The appropriate molar ratio of the initiator component was then introduced by pipette and the reaction started by addition of the co-initiator.

The co-initiator used was methylaluminoxane (30% solution in toluene) (MAO).

Once conversion was complete, the reaction was shortstopped with a 1% solution of 2,6-di-tert.-butylcresol in ethanol. The polymer was isolated and dried in the conventional manner. The initiator component used is shown in table 1.

Polymerisation Examples

TABLE 1

| Example | Initiator | Solvent (ml) | Initiator(a) (mmol/l) | Co-initiator(b) (mmol/l) MAO = I $Et_2AlCl$ = (II)* | Conversion (%) | $M_w$ (kg/mol) |
|---|---|---|---|---|---|---|
| 1 | 2-chloropropane | toluene (15) | 5.95 | 59.5 (I) | 90.4 | 351 |
| 2 | neopentyl chloride | toluene (15) | 5.95 | 59.5 (I) | 100 | 396 |
| 3 | t-butyl chloride | toluene (15) | 5.95 | 59.5 (I) | 87.6 | 30 |
| 4 | t-butyl chloride | hexane (15) | 5.95 | 59.5 (I) | 79.2 | 115 |
| 5* | t-butyl chloride | toluene (15) | 5.95 | 59.5 (II) | 94.2 | 35* |

TABLE 1-continued

| Example | Initiator | Solvent (ml) | Initiator(a) (mmol/l) | Co-initiator(b) (mmol/l) MAO = I Et₂AlCl = (II)* | Conversion (%) | $M_w$ (kg/mol) |
|---|---|---|---|---|---|---|
| 6 | 1-chloropentane | toluene (15) | 5.95 | 59.5 (I) | 56.8 | 740 |
| 7 | 1-chloropentane | hexane (15) | 5.95 | 59.5 (I) | 37.5 | 941 |
| 8 | 1-chlorohexane | hexane (15) | 5.95 | 59.5 (I) | 45.2 | 715 |
| 9 | chloroethane | toluene (15) | 5.95 | 59.5 (I) | 61.5 | 496 |
| 10 | chloroethane | hexane (15) | 5.95 | 59.5 (I) | 100 | 610 |
| 11 | chloroethane | hexane (15) | 11.92 | 59.5 (I) | 39.5 | 986 |
| 12* | chloroethane | toluene (15) | 5.96 | 59.6 (II) | 32.8 | 375* |
| 13 | chloromethane | hexane (15) | 5.95 | 59.5 (I) | 100 | 580 |
| 14 | 1-chlorobutane | hexane (15) | 5.95 | 59.5 (I) | 89.4 | 598 |

*Comparative example

Reaction Conditions $t_{reactor}$=5 h at $T_{react}$=−40° C.; 24 h at −33° C. (tests 1 to 9) or 24 h at −40° C. (tests 10 to 14) (unstirred); monomer concentration: 5.95 mol/l

TABLE 2

Comparative examples (without co-initiator)

| Example | Initiator | Concentration (mmol/l) | Solvent (ml) | Conversion (%) |
|---|---|---|---|---|
| 1 | MAO | 59.5 | hexane (15) | 0 |
| 2 | Et₂AlCl | 5.95 | hexane (15) | 0 |
| 3 | chloroethane | 5.95 | hexane (15) | 0 |

Result

As is clear from the comparative examples (table 2), without a co-initiator, neither MAO, nor diethylaluminium chloride nor chloroalkanes initiate isobutene polymerisation under the stated conditions.

When MAO is used as co-initiator and a primary alkyl halide is simultaneously used as initiator, molecular weights distinctly higher than those of the prior art (example 5 and 12 in table 1) are achieved at elevated rates of conversion and it is thus possible, by virtue of the temperature dependency of molecular weight, to perform polymerisation at higher temperatures.

We claim:

1. Process for the production of polyisoolefins comprising polymerizing isoolefins of the formula $CH_2=CR^1.R^2$ where $R^1$ denotes methyl and $R^2$ denotes $C_1$–$C_{10}$ alkyl or $C_3$–$C_{10}$ cycloalkyl, optionally together with conjugated or unconjugated dienes with 4 to 20 carbon atoms and/or cationically polymerisable, mono- or polyunsaturated compounds with 4 to 20 carbon atoms at temperatures of −100° C. to +200° C. and pressures of 0.1 to 100 bar in solution, in suspension or in the gas phase in the presence of initiator systems consisting of:

a) mono- or polyfunctionalised hydrocarbons of the formula (I)

in which

X denotes halogen, SCN, CN, OH, $OR^5$, $OCOR^5$ or $COOR^5$, where $R^5$ denotes $C_1$–$C_{10}$ alkyl or $C_3$–$C_{10}$ cycloalkyl, and $R^3$, $R^4$, $R^5$ are identical or different and mean hydrogen, $C_1$–$C_{10}$ alkyl, $C_3$–$C_{10}$ cycloalkyl, $C_6$–$C_{18}$ aryl, $C_2$–$C_{10}$ alkynyl or $C_3$–$C_{10}$ alkyne, optionally substituted by X, and b) an open-chain and/or cyclic aluminoxane compound of the formula (II) or (III)

in which $R^x$, $R^y$, $R^z$, $R^w$ are $C_1$–$C_{12}$ alkyl and m represents an integer from 5 to 30.

2. Process according to claim 1, wherein the process is performed at temperatures of −100° to +100° C.

3. Process according to claim 1, wherein the process is performed at pressures of 1 to 50 bar.

4. Process according to claim 1, wherein initiator component a) is used at a concentration of $10^{-2}$ to $10^{-7}$ mol per liter of reaction volume.

5. Process according to claim 1, wherein initiator component b) is used in a molar ratio relative to component a) of 1:100 to $10^4$:1.

* * * * *